United States Patent [19]

Boccagno et al.

[11] Patent Number: 4,666,066
[45] Date of Patent: May 19, 1987

[54] THERMOPLASTIC GRID MELTER

[75] Inventors: George E. Boccagno; John M. Raterman, both of Lawrenceville; Theo M. Hadzimihalis, Marietta; Charles H. Scholl, Duluth, all of Ga.

[73] Assignee: Nordson Corporation, Amherst, Ohio

[21] Appl. No.: 792,674

[22] Filed: Oct. 29, 1985

[51] Int. Cl.[4] .......................... B67D 5/48; B67D 5/62
[52] U.S. Cl. .................................. 222/146.5; 219/421; 222/318; 222/330; 222/333; 222/377; 222/485
[58] Field of Search ............... 222/146.1, 146.2, 146.5, 222/148, 288, 318, 333, 377, 556, 330, 334, 510, 108, 110, 330, 478, 481, 482, 484, 485; 219/421; 137/625.24, 565; 417/238, 295

[56] References Cited

U.S. PATENT DOCUMENTS

| | | | |
|---|---|---|---|
| 2,507,757 | 5/1950 | Braaten | 222/288 X |
| 3,320,895 | 5/1967 | Peterson et al. | 222/333 X |
| 3,366,280 | 1/1968 | Sampson et al. | 222/333 X |
| 3,692,213 | 9/1972 | Alta et al. | 222/510 X |
| 3,866,801 | 2/1975 | Stapleton | 222/510 X |
| 3,876,105 | 4/1975 | Kelling | 222/146.5 X |
| 3,981,416 | 9/1976 | Scholl | 222/146.1 |
| 4,009,974 | 3/1977 | Scholl | 222/146.5 |
| 4,073,409 | 2/1978 | Gardner et al. | 222/146.5 |
| 4,129,232 | 12/1978 | Coupar | 222/510 X |
| 4,219,728 | 8/1980 | Mercer | 222/146.5 X |
| 4,308,447 | 12/1981 | Notzold et al. | 222/146.5 X |
| 4,474,311 | 10/1984 | Petrecca | 222/146.5 |
| 4,485,941 | 12/1984 | Frates et al. | 222/146.5 |
| 4,485,942 | 12/1984 | Petrecca | 227/146.5 |
| 4,545,504 | 10/1985 | Fabel et al. | 222/146.5 X |

Primary Examiner—Joseph J. Rolla
Assistant Examiner—Kevin P. Shaver
Attorney, Agent, or Firm—Wood, Herron & Evans

[57] ABSTRACT

Apparatus for melting and dispensing thermoplastic material including a hopper for receiving solid thermoplastic material, a flow-through grid melter secured to the bottom of the hopper and a reservoir mounted beneath the grid melter. A pump is mounted in the bottom of the reservoir and is connected to the reservoir outlet via a flow passage which contains a gate valve operable to enable the passage to be blocked and the pump removed for repair or replacement without the need to first drain the reservoir of molten material. The pump is driven by a motor which is mounted upon a pivotally supported plate such that the motor may be easily and quickly disconnected from the pump to further facilitate quick repair or replacement of the pump.

5 Claims, 7 Drawing Figures

THERMOPLASTIC GRID MELTER

This invention relates to apparatus for melting and dispensing thermoplastic materials.

Historically, thermoplastic materials or so-called "hot melt" materials were converted from a solid to a molten state in a tank having heated walls. The melted material was maintained in the molten state in the tank in sufficient volume to supply one or more applicators or dispensers. If the job or application required a substantial volume of hot melt material, a substantially large volume of material was required to be maintained in the molten or melted state to meet that need. That substantial volume usually necessitated a long warm up or start up time for the apparatus, as well as prolonged exposure of at least some of the molten material to heat and/or to oxygen. Since many thermoplastic materials oxidize, char or degrade as a result of prolonged exposure to heat and/or oxygen, there was a need for a more efficient melter.

That need for a more efficient thermoplastic material melter was met or satisfied by a so-called grid type hot melt applicator wherein the solid thermoplastic material was stored in a hopper and melted upon the top of a heated grid located at the bottom of the hopper. That melted material then passed through holes in the grid into a relatively small holding reservoir from which the molten material was supplied by a pump at the bottom of the reservoir to a dispenser. The grid type applicator was capable of melting a very high throughput of thermoplastic material in a very short time so that as a result, the molten material was not maintained in a molten state for prolonged periods of time to char, oxidize, or otherwise degrade. A typical grid type hot melt applicator is disclosed in U.S. Pat. No. 3,964,645.

There have been grid type applicators which combine the high melt rate and the efficiency of a grid type applicator with a high throughput of material by enlarging the capacity of the hopper, the grid melter and the reservoir. Such high throughput or large capacity grid type applicators or so-called "grid melters," are subject to periodic failure or clogging of the applicator pump. In that event, the pump must be removed and repaired or replaced. Removal of the pump, though, results in long downtimes of the applicator and substantial quantities of waste thermoplastic material because the pump cannot be removed without first draining the reservoir of molten thermoplastic material. That draining of the reservoir has always been a slow, time consuming process which resulted in substantial expense because of the loss of the use of the applicator while it drained and because of the loss of substantial waste thermoplastic material.

It has therefore been an objective of this invention to provide a grid type thermoplastic applicator which may be quickly and efficiently repaired in the event of pump failure or scheduled maintenance and without the loss of appreciable thermoplastic material.

This objective is achieved and this invention is partially predicted upon the concept of locating a gate type valve in the molten thermoplastic material flow path between the molten material reservoir outlet and the pump for supplying that material from the reservoir to the molten thermoplastic material dispenser. By so locating a valve, it is possible to close the valve whenever the pump needs to be replaced and the pump can then be removed without the necessity of first draining the reservoir of molten thermoplastic material.

In the course of removing the pump from the applicator, the motor for driving the pump must be disconnected from it. It has therefore been another objective of this invention to provide a motor mount for facilitating quick disconnection of the driving motor from the pump so as to enable the pump to be quickly and efficiently removed from the applicator.

This objective is achieved and this aspect of the invention is predicated upon the concept of mounting the drive motor apart or remote from the pump and of connecting the motor to the pump via a drive belt or chain. The motor is mounted upon a motor mount plate which is pivotally connected to a supporting element by a bolt about which the plate is pivotable. The plate is locked by a second bolt in an adjusted position in which the drive belt or chain is taut. To disconnect the drive motor from the pump, all that is required is to loosen the second bolt, pivot the mounting plate so as to put slack in the drive belt or chain, and remove the belt or chain from its connection with the pump.

The grid melter of this invention comprises a reservoir atop which there is mounted a heated grid. A hopper for receiving the solid thermoplastic material is mounted atop the heated grid. Mounted in the bottom of the reservoir there is at least one pump and a flow path or flow passage from the reservoir outlet to the pump inlet. A manually operable gate valve is located in this flow path so as to enable the flow path to the pump to be blocked by closure of the valve. In the preferred embodiment of the invention, there is also a plugged drain port in the bottom of the reservoir which, when the valve is in the closed position, is connected by the valve to the reservoir outlet. This drain port and connection to the outlet of the reservoir by the gate valve enables the reservoir to be quickly drained of molten material without the need for the material to pass through the pump.

The primary advantage of this grid melter is that it enables the pump of the melter to be more quickly replaced or repaired than prior art grid melters with a resulting minimum downtime of the applicator. It also minimizes waste thermoplastic material in the event of a pump failure or need to remove the pump from the applicator.

These and other objects and advantages of this invention will be more readily apparent from the following description of the drawings in which.

OVERALL APPARATUS

Figure 1:
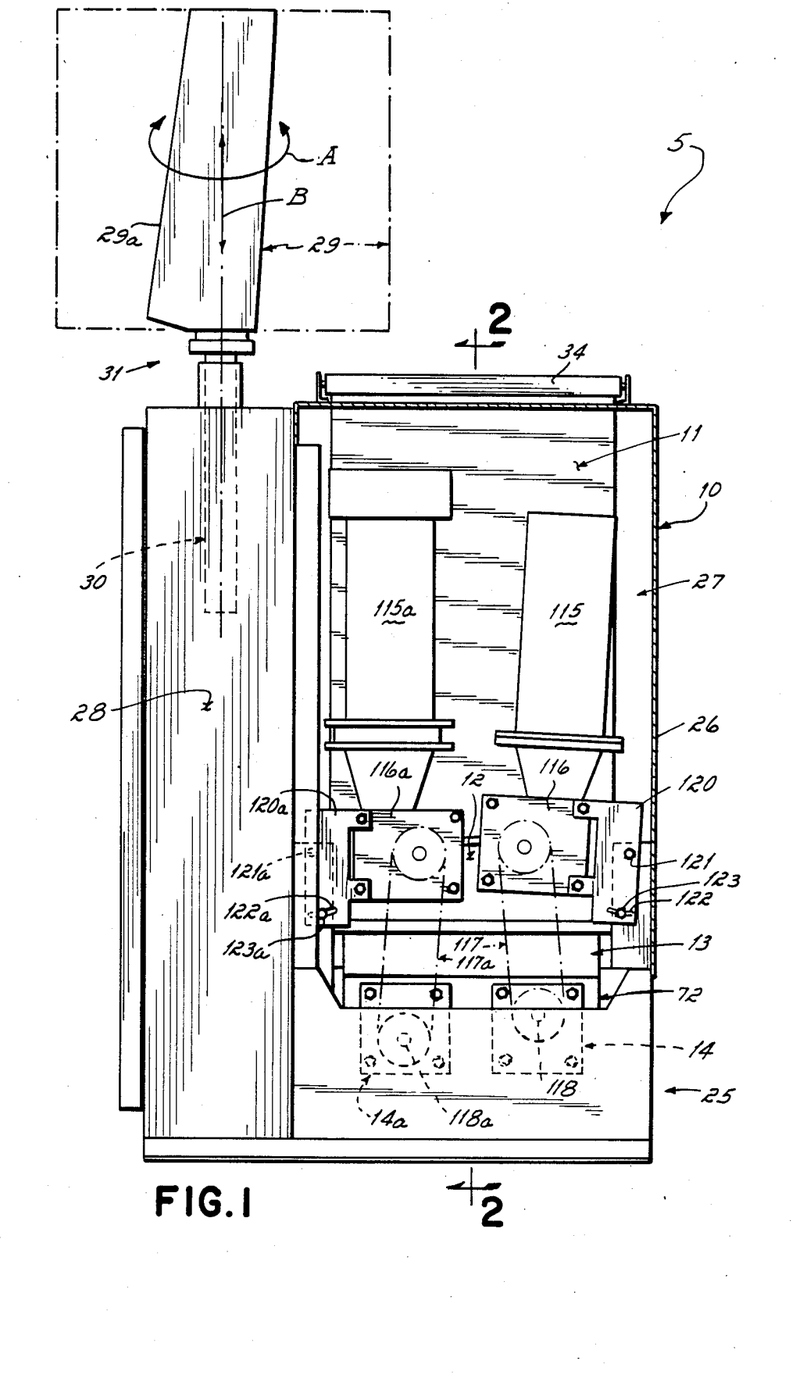
FIG. 1 is a side elevational view, with the covering shroud partially broken away, of a grid melter incorporating the invention of this application.
Figure 2:
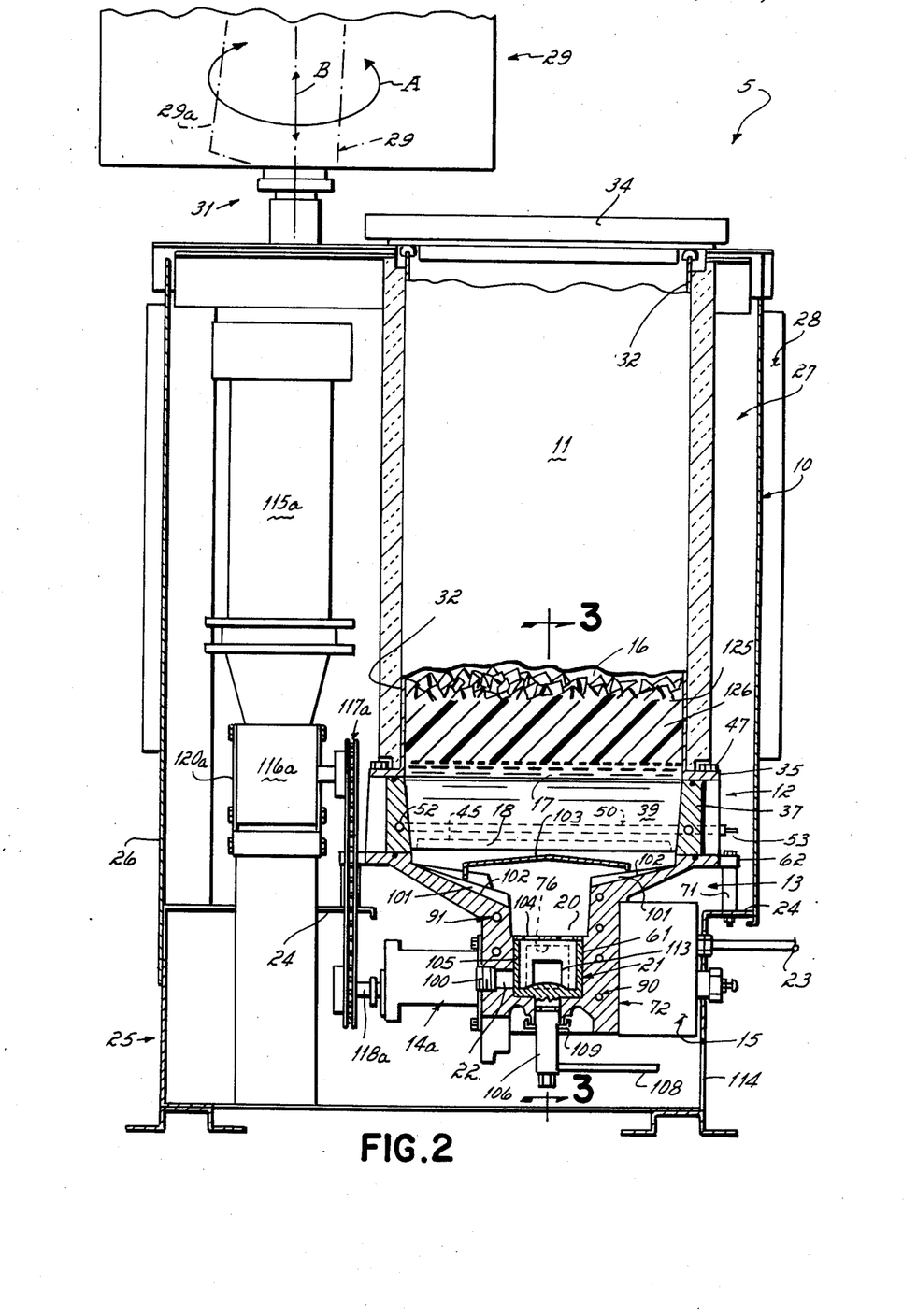
FIG. 2 is a cross-sectional view taken on line 2—2 of FIG. 1.

Referring now to the drawings, and more particularly, to FIGS. 1 and 2, it will be seen that the thermoplastic material melting and dispensing apparatus 5 of this invention comprises a housing or covering shroud 10 within which there is located a hopper 11, a heated grid 12 (FIGS. 2, 3 and 4), a reservoir 13, a pair of gear pumps 14, 14a, and a manifold block 15. Solid thermoplastic material 16 in the form of chunks or blocks are placed in the top of the hopper 11 from which they flow through the open bottom into contact with the top surface of the grid 12. The grid 12 is heated so that surface contact of the solid thermoplastic material with the top surface of the grid causes the solid thermoplastic material to be melted and converted to a molten state. The molten thermoplastic material 17 then flows downwardly through bottom passageways 18 in the grid melter into the reservoir 13 located immediately beneath the melter 12. The reservoir has a sloping bottom which directs the molten material toward the inlet 20 of a gate valve 21. This gate valve 21 is then operative to direct the molten thermoplastic material into the inlets of the pumps 14, 14a, or alternatively, depending upon the position of the gate valve, to a reservoir dump port 22. Assuming that the gate valve is positioned so as to direct the flow to the pumps 14, 14a, those pumps then move the molten material into the manifold block 15 from whence it is directed to one or more conventional applicators or dispensers (not shown) via hoses or conduits 23.

Housing

The housing 10 comprises a base 25 and a cover 26 mounted atop the base. The cover encloses two sections of the applicator, the melt section 27 and the control section 28. The two sections are separated by an insulated barrier (not shown). Within the control section 28 are all of the electrical components for controlling the temperature of the components throughout the system. Mounted atop the control section 28 of the housing there is a control console 29. This console 29 is rotatably mounted atop the control section 28 and is electrically connected to control components of the applicator via electrical leads (not shown) which are contained within a conduit 30. The console 29 is mounted atop the control section 28 of the housing by a connector 31 which permits the console to be rotated, as indicated by the arrow A (FIG. 1), or vertically adjusted as indicated by the arrow B. These adjustments enable the operator to more easily and conveniently interface with the controls and with the diagnostic indicators on the face 29a of the console. These adjustments also enable the applicator 5 to be positioned in the most convenient location relative to the operator's normal work station.

The top of the housing 10 has an opening beneath which there is located the hopper 11. The hopper comprises a vertical tube-shaped aluminum member 32, the bottom 33 of which is open and the top of which is closed by a lid 34. Around the periphery of the bottom of the hopper there is a flange 35 which is bolted to the top of the heated grid melter 12 (see FIG. 3).

Heated Grid

Figure 3:
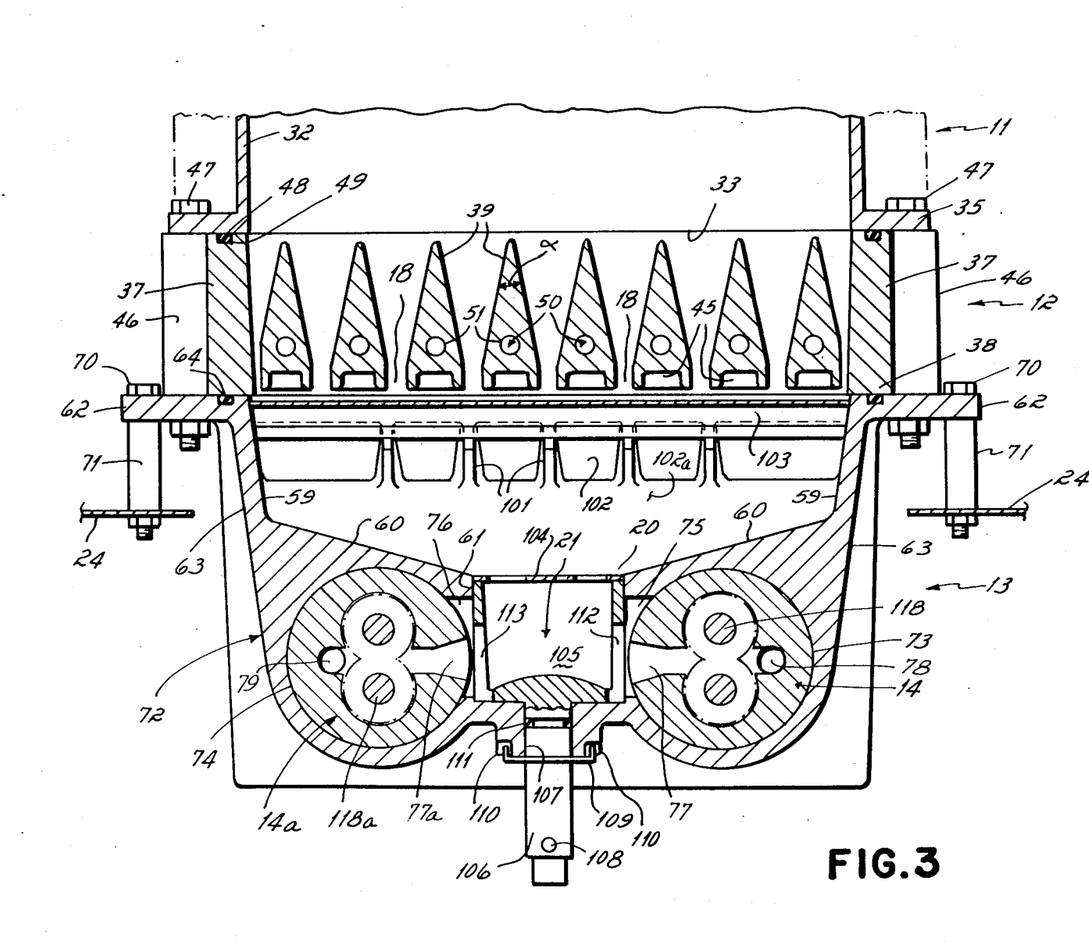
FIG. 3 is a cross-sectional view taken on line 3—3 of FIG. 2.
Figure 4:
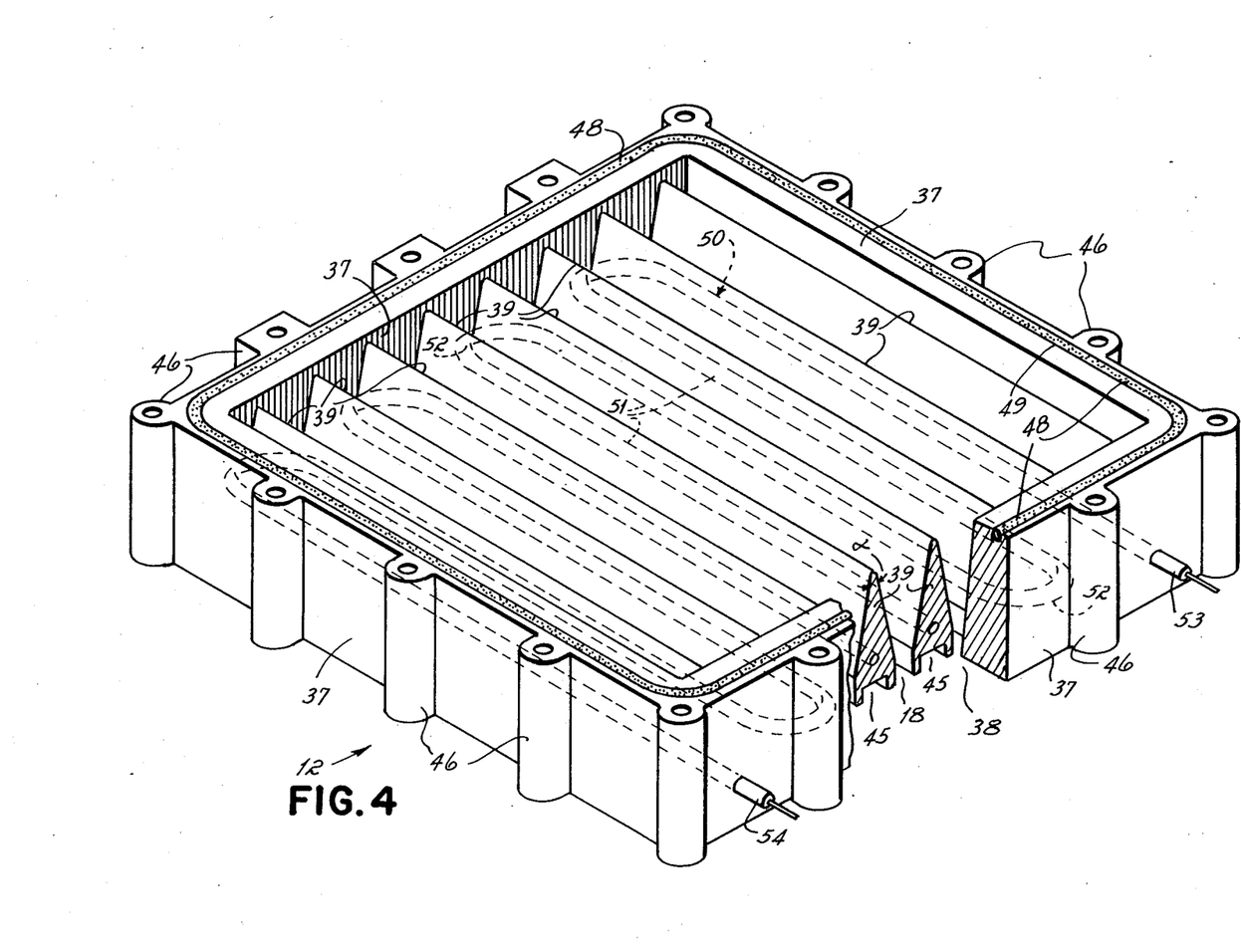
FIG. 4 is a perspective view, partially broken away, of the heated grid portion of the grid melter of FIG. 1.

Referring to FIGS. 3 and 4, it will be seen that the heated grid 12 comprises a receptacle into which solid thermoplastic material flows from the hopper 11. This receptacle comprises four side walls 37 and a bottom 38. The grid melter 12 comprises a plurality of spaced parallel ribs 39, each rib of which is shaped as a tall and thin triangle in cross section. These parallel ribs all extend from one side wall 37 to the opposite side wall 37. There are open passageways 18 located on opposite sides of each rib and extending for the length of the rib. These passageways 18 open into the top of the reservoir 13.

The underside or wide base of each triangularly shaped rib has a downwardly open recess or cavity 45 formed therein. These recesses extend for the full length of each rib and, as explained more fully hereinafter, function as air or gas pockets when the grid melter is used to melt solid thermoplastic material and the molten material raises up over the bottom surface of the grid melter.

The grid melter 12 is formed as an integral metal casting. This casting has external lugs 46 formed on each end and side wall 37. Each lug is vertically bored to accommodate bolts 47 for mounting the hopper on top of the grid melter 12 and the grid melter upon the top of the reservoir 13. Between the bottom of the hopper and the top of the grid there is a seal 48 which is located within a peripheral groove 49 of the grid. This seal 48 forms a liquid and gas tight seal between the hopper and grid.

Cast in situ into the grid melter there is a sinuous shaped electrical resistance heater element 50. This element 50 has straight horizontal sections 51 extending for the length of each rib of the grid melter and has 180° radiused turn sections 52 imbedded in the end walls 37. The opposite ends 53, 54 of this electrical heating element 50 extend from one side wall 37 of the grid melter and are adapted to be connected to a source of electrical power. Although not shown in the drawings, there is a temperature sensor device mounted within the grid melter. This device is used to control and maintain the temperature of the grid melter at a preset temperature.

In the preferred embodiment of the grid melter 12, the ribs 39 in cross section are shaped as tall, thin triangles. This configuration has been found to provide optimum melt rate and sufficient strength to support large loads of material found in this type of melter.

Reservoir

Figure 5:
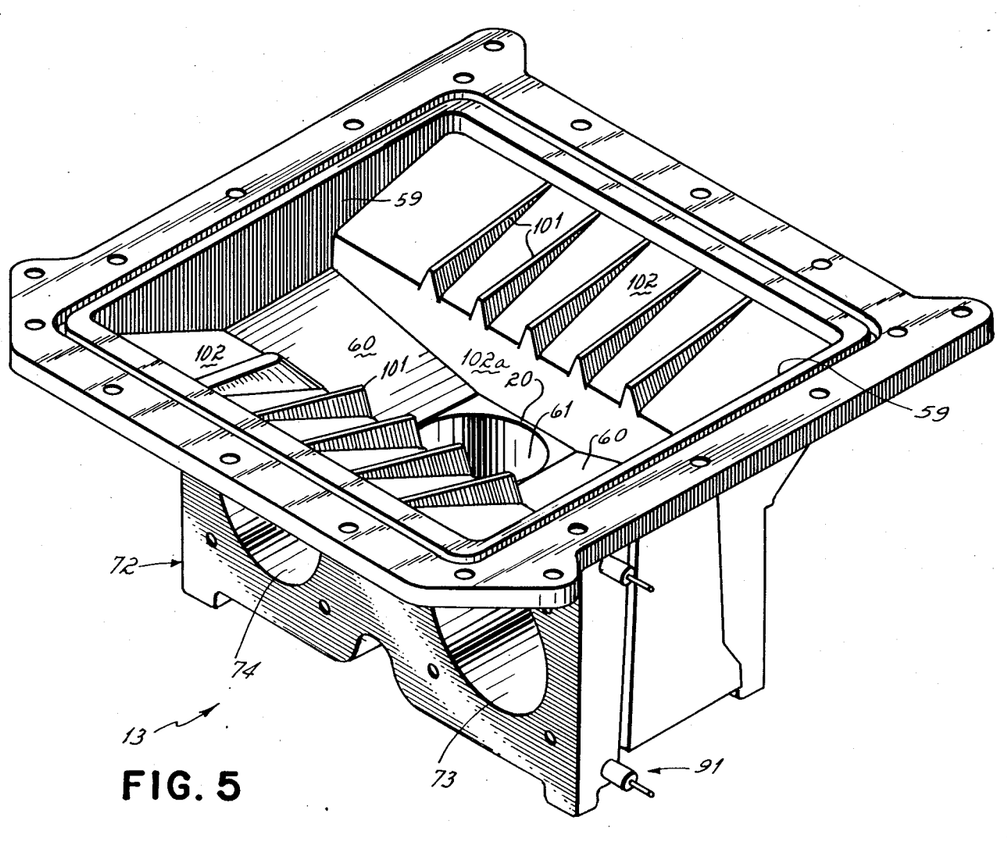
FIG. 5 is a perspective view of the reservoir portion of the grid melter of FIG. 1.

The reservoir 13 comprises an open top, closed bottom receptacle which is fixedly mounted to the bottom of the grid melter 12. The reservoir has inwardly sloping side walls 59, end walls 102, 102a and bottom walls 60, all of which slope toward a central bottom opening 61. The gate valve 21 is mounted within this opening 61.

The attachment of the reservoir 13 to the bottom of the grid melter 12 is by means of a flange 62 which extends outwardly from the top edge of the side walls 63 of the reservoir. The top surface of this flange 62 has a shallow groove formed therein within which there is fitted a liquid and gas tight seal 64. The bolts 47 which extend through the external lugs 46 of the grid melter extend through the flange 62 of the reservoir so as to secure the grid melter 12 in an assembled relationship between the flange 35 of the hopper and the flange 62 of the reservoir.

Extending between the flange 62 and a horizontal shelf section 24 of the housing 26 there are bolts 70 which secure the housing 26 to the flange of the reservoir. A sleeve-type spacer 71 surrounds each bolt and determines the spacing between the shelf section 24 of the housing 26 and the flange 62 of the reservoir.

In addition to the central bottom opening 61 formed in the bottom section 72 of the reservoir, there are a pair of spaced bores 73, 74 formed therein. These bores are open to the central bottom opening 61 via transverse passageways 75, 76 (see FIG. 3). The pumps 14, 14a are mounted within these bores 73, 74, respectively. The passageways 75, 76 interconnect the central opening in the bottom of the reservoir to the inlets 77, 77a of the pumps 14, 14a. The outlets of these pumps 14, 14a are connected via passageways 78, 79 in the pump and by passages 78c, 79a in the bottom section 72 of the reservoir to flow passages (not shown) in the manifold block 15, which in turn connect the pumps to the outlet hoses 23. These hoses 23 in turn are connected at their discharge ends to conventional thermoplastic material dispensers, such as either manual or automatic dispensing guns.

Many thermoplastic material applicators incorporate continuous recirculation of the molten thermoplastic material into the apparatus. If the molten material is to be recirculated, a conventional recirculating line (not shown) in the manifold block 15 is connected via a pressure control/circulation valve (not shown) to return passageways 80, 81 (FIGS. 6 and 7) in the bottom section 72 of the reservoir.

Figure 7:
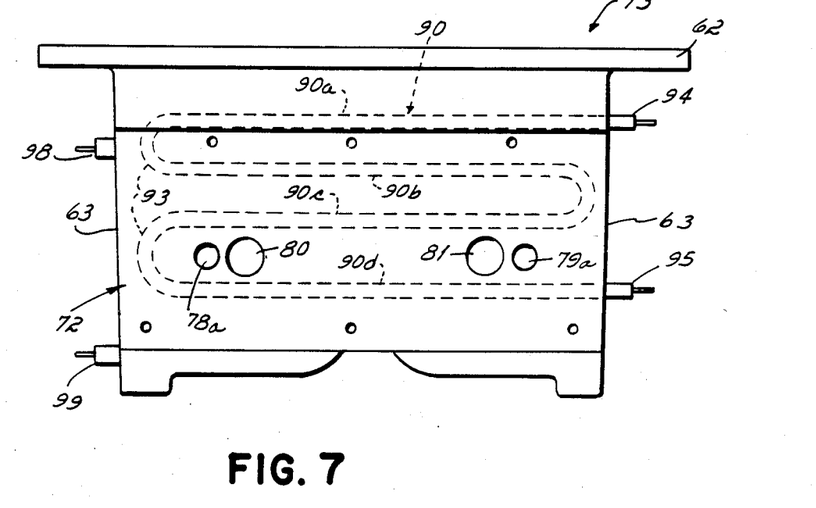
FIG. 7 is a side elevational view of the end of the reservoir opposite from the end illustrated in FIG. 6.

The bores 73, 74 within which the pumps 14, 14a are mounted extend transversly through the bottom section 72 of the pump reservoir. Extending longitudinally of the bottom section 72 of the reservoir there are a pair of heaters 90, 91. Both of these heaters comprise a single, electrical resistance heating element which is preferably cast in situ into the casting from which the reservoir 13 is manufactured. One of these heaters 90, which is best illustrated in FIG. 7, comprises four horizontal runs 90a, 90b, 90c, and 90d of heater element interconnected at the ends by 180° arcuate end sections or bends 93 such that in elevational profile, the complete heater element 90 is generally W-shaped. The ends 94, 95 of this heater element extend outwardly from the side wall of the reservoir and are connected by conventional electrical leads (not shown) to controls contained within the control section 28 of the housing 26.

Figure 6:
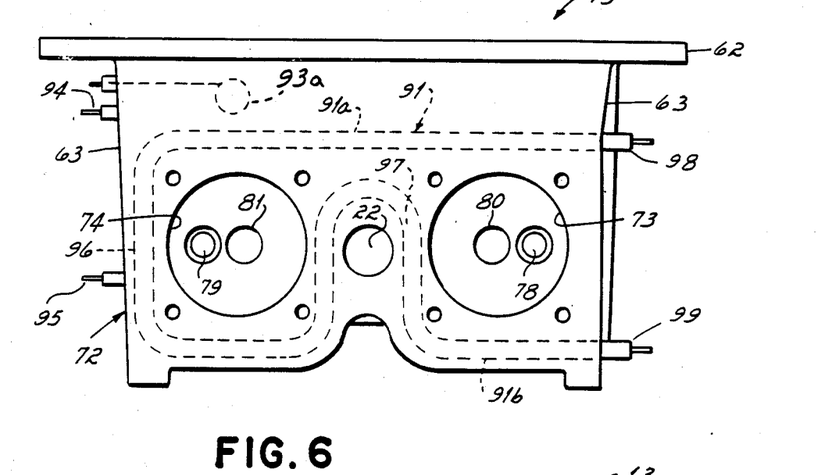
FIG. 6 is a side elevational view of one end of the reservoir of FIG. 5.

The other heater 91 is best illustrated in FIG. 6. With reference to this Figure, it will be seen that this heater has an upper horizontal run 91 and a lower horizontal run 91b interconnected by a vertical section 96. The lower run has an upwardly extending loop 97 therein which is located between the two pumps 14, 14a and wraps around the dump port 22 of the reservoir. The ends 98, 99 of the heater element 91 extend outwardly from the side wall of the reservoir and are connected via electrical leads (not shown).to controls contained within the control section 28 of the housing 26.

The two reservoir heaters 90, 91 differ in size and shape. These heaters are sized and balanced so as to be controllable from a single thermostat control 93a while still maintaining an even temperature throughout the reservoir.

A drain plug 100 is mounted within the threaded dump port or bore 22 of the reservoir. This bore extends through the wall of the reservoir and intersects the central opening 61. Depending upon the setting of the gate valve 21, the bottom of the reservoir is either open and connected to the inlets of the pumps 14, 14a, or to the drain plug receiving bore 22. This plug is located at this position in the reservoir so as to enable the reservoir to be drained of molten thermoplastic material without the molten material having to pass through the pumps in the event that it should ever become necessary to drain the reservoir quickly.

With reference to FIGS. 2 and 5, it will be seen that there are a plurality of parallel ribs 101 extending upwardly from the end walls 102 of the reservoir. These ribs function to increase the surface area of the bottom of the reservoir over which the melted thermoplastic material must flow in the course of its passage from the grid melter into the central opening 61 of the reservoir. To ensure that the molten material flows over the ribbed end wall 102 and does not fall directly from the openings 18 in the bottom of the grid into the central opening 61 in the reservoir, there is a shield 103 located over the top of the wall 60 and opening 61. This shield tapers downwardly so that molten material falling onto it flows by gravity down the sides of the shield onto the upper portion of the end walls 102 of the reservoir. This shield 103 ensures that all of the molten material passes over the end walls 102 before flowing onto the bottom wall 60 and entering the central opening 61 in the reservoir. Quite commonly, the application temperature of the molten material is greater than the temperature at which it converts from the solid to the molten state and falls through the openings 18 and the grid melter. The material is then further heated within the reservoir as a consequence of surface contact of the material with the surfaces of the reservoir before the molten material flows into the gate valve 20. The shield 103 functions to ensure that the molten material is exposed to and, if necessary, raised in temperature to the desired temperature at which it is to enter the pumps 14, 14a.

Gate Valve

The opening 61 in the bottom of the reservoir which receives the gate valve 21 is shaped as a stepped bore which extends vertically through the bottom of the reservoir 13. The gate valve 21 which fits into this opening 61 is shaped as an open top cup 105 having a shaft 106 depending therefrom. The shaft 106 fits within the smaller diameter lower end section 107 of the bore 61 and is rotatable therein. Rotation of the shaft 106 is effected manually by rotation of a handle 108 which extends radially from the shaft 106. Rotation of the handle is limited to 90° by engagement of a stop pin 109 which extends transversly through the shaft 106 and is engageable with abutments 110 formed on the underside of the bottom section 72 of the reservoir. To prevent leakage of adhesive from the opening and along the exterior of the shaft 106, there is a sealing O-ring 111 mounted within an annular groove of the shaft. This O-ring also functions to frictionally hold the gate valve 21 in either of its two positions of adjustment.

There are a pair of opposed openings 112, 113 in the side wall of the upper end section or cup-shaped section 105 of the gate valve 21. In one position of the gate valve, these openings 105, 106 are aligned wtih the passages 75, 76 which open to the inlet ports of the pumps 14, 14a, respectively. In the other position of the gate valve, in which the valve is rotated 90° from the position illustrated in FIG. 3, one of the openings 112, 113 is aligned with the drain port 22. In this latter position of the gate valve in which one of the openings 112, 113 is aligned with the drain port 22, the passages 75, 76 to the inlet ports of the pump are blocked by solid portions of the cup-shaped upper end section 95 of the gate valve.

In order to operate the gate valve and move it between its two positions, the handle 108 must be manually grasped and rotated. To that end, the base section 25 of the housing 10 has an opening 114 through which the handle 98 may be accessed (FIG. 2).

In the preferred embodiment of the gate valve 21, there is a cover or strainer plate 104 secured over the open top of the gate valve. This cover or strainer 104 has apertures or holes in it sized so that it is effective to screen out nuts, bolts, or large chunks of solid thermoplastic material from entering the pumps or clogging the passageways to the entry ports of the pumps.

Pumps

While the pumps 14, 14a are identical gear pumps, they can be of any construction compatible with the intended use of the apparatus. Further, they need not both be of the same size or style. A complete description of one appropriate type of gear pump may be found in U.S. Pat. No. 3,964,675. Accordingly, these pumps have not been described in detail herein.

Each pump 14, 14a is mounted within one of the bores 73, 74 of the reservoir bottom section 72 and has an inlet port 77, 77a open to the passages 75, 76, respectively. Each pump 14, 14a has an outlet port connected via passageways 78, 79 in the reservoir bottom section 72 to passages in the manifold block 15.

In the illustrated embodiment, there are two pumps connected by the gate valve 20 to the bottom of the reservoir 13 and operative to supply molten thermoplastic material to the manifold block 15. In many applications, there will be only a single pump utilized rather than two pumps. The choice is dependent upon the quantity of thermoplastic material being supplied to the dispensers and the number of dispensers connected to the manifold block 15.

The manifold block is ported such that the molten material flowing from the outlet ports of the pumps 14, 14a flows to selected outlet ports of the manifold block 15. Those outlet ports are in turn connected to dispensers (not shown) via the hoses 23.

The pumps 14, 14a are independently driven in rotation by drive motors 115, 115a. Each drive motor 115, 115a is operatively connected to the input drive shaft of one pump via a gear or transmission box 116, 116a, the output shafts of which are connected via a chain and sprocket drive 117, 117a to the input shafts 118, 118a of the pumps 14, 14a. The gear or transmission boxes 116, 116a and attached motors 115, 115a are each mounted upon a pivotally supported mounting block 120, 120a. Each of these blocks 120, 120a is pivotally supported from a pivot post 121, 121a and has an arcuate slot 122, 122a through which there extends a bolt 123, 123a. When the bolts are loosened, the mounting plates 120, 120a are free to pivot about the pivot post 121, 121a. Thereby the tension of the chains of the chain and sprocket drives 117, 117a may be adjusted. Furthermore, in the event that the pumps 14, 14a should need replacement or should require repair, all that is required is to pivot the motor and attached driving gear box and the mounting plate upon which it is mounted about the pivot post 121 or 121a so as to loosen the chain of the associated chain and sprocket drive 117 or 117a. The chain may then be removed from the sprocket on the end of the shaft 118, 118a, and the pump 14, 14a may then be pulled from the bottom section 72 of the reservoir 13.

It will be appreciated that this quick disconnect characteristic of the drive to the pumps 14, 14a from the drive shafts of the motors enables the pumps to be very quickly removed and replaced or repaired. When this feature is combined with the gate valve 21, the pumps are particularly easily and quickly replaced because there is no need to drain the reservoir 13 before removing the pump for repair or replacement. All that is required to remove a pump 14, 14a is to close the gate valve, disconnect the chain of the associated chain and sprocket drive 117, 117a and unbolt the pump from its mounting within the bottom section 72 of the reservoir within which it is mounted. There is no need to drain the reservoir, and disconnection of the drive to the pump requires no more than loosening of the bolt 123, 123a so as to place slack in the chain of the chain and sprocket drive 117, 117a.

Hopper Melt Back

The heater grid described hereinabove is constructed so as to prevent molten thermoplastic material from leaking through the seals 48, 64 between the hopper, the grid melter, and the reservoir upon remelt of solid thermoplastic material contained within the hopper.

With reference to FIG. 2, it will be seen that molten material melted by the grid melter 12 backs up in the hopper 11 whenever the feed stock 16 is melted by the grid melter 12 at a faster rate than it is dispensed through the dispensers (not shown). This condition is one which occurs relatively frequently with the result that the molten material backs up a substantial distance into the hopper as indicated by the interface 125 between feed stock 16 and solid material 126. In the event that the dispenser is then shut down and the complete apparatus is turned off and allowed to cool after the molten material has backed up to the interface 125 in the hopper, the molten material will all solidify in the hopper. In the case of many hot melt adhesives, the molten material adheres to the inside walls of the hopper 11 upon solidification. Upon restarting of the apparatus, that solidified material contained in the hopper must be remelted. However, because most thermoplastic materials have poor heat conductive qualities, it often takes a long time to restart the apparatus and remelt all of the formerly molten, but now solidified, material 126 contained within the hopper. While this remelt is occurring, molten material will be entrapped beneath a solid "bridge" or cap 126 of formerly molten, but now solid, thermoplastic material adhered to the inside walls of the hopper. That solid "bridge" or cap serves to entrap any pressure buildup which occurs upon thermal expansion of the remelted material 17 entrapped beneath the plug 126. Many thermoplastic materials, and particularly pressure sensitive thermoplastic materials, have a high coefficient of expansion with the result that when these materials are remelted in the hopper, there is a substantial pressure buildup beneath the solid plug 126 in the hopper. Prior to this invention, that plug and the resulting pressure often built up to a pressure sufficient to force molten material to squeeze through the seals 48, 64 between the hopper and the grid or between the grid and the reservoir with the result that the apparatus sprang a leak or blew out the seals.

The downwardly open recesses or cavities 45 on the underside of each of the ribs 39 of the grid melter function to prevent pressure buildup under these conditions. Air or gas becomes entrapped within those recesses 45 when the liquid level rises above the bottom of the grid melter. Consequently, under the conditions described hereinabove, when there is a solid bridge or cap over the top of the grid melter and molten material beneath the grid melter, that pressure buildup which would otherwise occur upon expansion of the molten material is accommodated by the air or gas filled recesses 45 which now function as pressure accumulators to accommodate that expansion of the molten material. Consequently, there is no pressure buildup sufficient to squeeze molten material through the seals 48, 64 or to cause the seals to spring a leak.

Operation

In the operation of the applicator 5, the desired temperatures for each of the heaters or heater sections of the applicator is initially inputted to the control console 29 by actuation of the appropriate controls on the face 29a of that console. After the apparatus has had time to warm up or to come up to temperature, that condition is indicated on the readout displays on that same face 29a of the console. When the applicator is at temperature and ready for use, solid chunks or blocks of thermoplastic material contained within the hopper 11 are melted as a consequence of surface contact of the thermoplastic material with the ribs 39 or side walls of the heated grid 12. That molten material then falls through the passages 18 between the ribs onto the deflector shield 103 in the reservoir. The shield 103 (FIG. 2) causes the molten material to flow outwardly over the surface of the shield and then inwardly over the surfaces of the reservoir into the open top of the gate valve 21. In the course of passage of the thermoplastic material over the shield 103 and then downwardly over the surfaces of the heated reservoir, the molten thermoplastic material is brought up to the desired application temperature or temperature at which it is programmed to enter the pumps 14, 14a. By utilizing the heated reservoir surfaces to bring the molten thermoplastic material up to temperature, rather than relying upon the heater elements of the grid to bring it up to application temperature, the period or duration for the thermoplastic material to be maintained at application temperature is minimized. Thereby, any tendency for the thermoplastic material to char or oxidize as a result of prolonged exposure to heat and oxygen while in the molten state is minimized. The thermoplastic material is then routed by the gate valve 21 to the inlets of the pumps 14, 14a and from those pumps, to the manifold block 15. The manifold block in turn routes the molten thermoplastic via hoses 23 to conventional manual or automatic dispensers.

In the event that one or both of the pumps 14, 14a should need to be removed for scheduled maintenance or for repair, all that is required is to manually move the gate valve 21 to the position in which the flow passages 75, 76 to the pump inlets are blocked by the valve. The pump or pumps may then be removed from their mounting bores 73, 74 in the bottom of the reservoir and repaired or replaced without the need to first drain the reservoir of molten thermoplastic material.

While we have described only a single preferred embodiment of our invention, persons skilled in the art to which this invention pertains will readily appreciate numerous changes and modifications which may be made without departing from the spirit of our invention. Therefore, we do not intend to be limited except by the scope of the following appended claims:

We claim:

1. An apparatus for converting solid thermoplastic material to molten thermoplastic material and for dispensing the molten thermoplastic material, comprising
   a housing including a hopper having side walls for receiving solid thermoplastic material,
   a flow-through grid melter secured to the lower portion of said hopper,
   means for heating said grid melter,
   at least one discharge opening through said grid melter,
   a reservoir mounted beneath said grid melter and adapted to receive molten material from said discharge opening of said grid melter, said reservoir having a discharge outlet,
   a pump mounted in the bottom of said reservoir and adapted to supply said molten thermoplastic material from said reservoir to a dispenser,
   means defining a flow path in said reservoir between said outlet of said reservoir and an inlet to said pump,
   a normally open valve located in said reservoir in said flow path, said valve being closable so as to block said flow path and enable said pump to be removed from said reservoir without the need for first draining said reservoir of molten thermoplastic material, and
   said reservoir containing a drain port, said valve being selectively operable to connect said drain port to said reservoir outlet.

2. The apparatus of claim 1 wherein said drain port contains a drain plug.

3. An apparatus for converting solid thermoplastic material to molten thermoplastic material and for dispensing the molten thermoplastic material, comprising
   a housing including a hopper having side walls for receiving solid thermoplastic material,
   a flow-through grid melter secured to the lower portion of said hopper,
   means for heating said grid melter,
   at least one discharge opening through said grid melter,
   a reservoir mounted beneath said grid melter and adapted to receive molten material from said discharge opening of said grid melter, said reservoir having a discharge outlet,
   a pump mounted in the bottom of said reservoir and adapted to supply said molten thermoplastic material from said reservoir to a dispenser,
   means defining a flow path in said reservoir between said outlet of said reservoir and an inlet to said pump,
   a normally open valve located in said reservoir in said flow path, said valve being closable so as to block said flow path and enable said pump to be removed from said reservoir without the need for first draining said reservoir of molten thermoplastic material,
   said reservoir having walls sloping downwardly toward said outlet of said reservoir, said outlet being open to a first vertical bore in the bottom of said reservoir, and
   said valve being generally cup-shaped and located within said bore, said valve having a side wall, a bottom wall, and a generally open top, a discharge port in said side wall of valve, and said discharge port being selectively alignable with said flow path defining means.

4. The apparatus of claim 3 wherein said pump is mounted in a second bore of said reservoir, said flow path defining means comprising a flow passage in said reservoir extending between said first and second bores.

5. The apparatus of claim 4 wherein said valve has a valve actuating shaft extending downwardly from the bottom of said reservoir, and a handle attached to said shaft for enabling said valve discharge port to be moved into and out of alignment with said flow passage in said reservoir.

* * * * *